United States Patent
Ali et al.

(10) Patent No.: US 11,415,170 B2
(45) Date of Patent: Aug. 16, 2022

(54) HYDRODYNAMIC THRUST BEARING PAD HAVING A VARIABLE TAPER, AND RELATED SYSTEMS AND METHODS

(71) Applicant: Ohio University, Athens, OH (US)

(72) Inventors: Muhammad Ali, Pickerington, OH (US); Khairul Alam, Athens, OH (US)

(73) Assignee: Ohio University, Athens, OH (US)

( * ) Notice: Subject to any disclaimer, the term of this patent is extended or adjusted under 35 U.S.C. 154(b) by 30 days.

(21) Appl. No.: 17/261,681

(22) PCT Filed: Jul. 26, 2019

(86) PCT No.: PCT/US2019/043668
§ 371 (c)(1),
(2) Date: Jan. 20, 2021

(87) PCT Pub. No.: WO2020/023878
PCT Pub. Date: Jan. 30, 2020

(65) Prior Publication Data
US 2021/0262519 A1    Aug. 26, 2021

Related U.S. Application Data

(60) Provisional application No. 62/711,166, filed on Jul. 27, 2018.

(51) Int. Cl.
*F16C 17/08*    (2006.01)
*F16C 33/18*    (2006.01)
(Continued)

(52) U.S. Cl.
CPC ............ *F16C 17/08* (2013.01); *F16C 17/243* (2013.01); *F16C 33/18* (2013.01); *F16C 33/201* (2013.01); *F16C 2208/02* (2013.01)

(58) Field of Classification Search
CPC ........ F16C 17/06; F16C 17/08; F16C 17/243; F16C 33/18; F16C 33/201; F16C 33/26; F16C 2208/02
See application file for complete search history.

(56) References Cited

U.S. PATENT DOCUMENTS 3,565,498 A    2/1971   Leopard et al.
3,829,180 A *  8/1974   Gardner ................. F16C 33/16
                                                   384/306

FOREIGN PATENT DOCUMENTS

DE    10032250 A1 *  1/2002   ............. F16C 17/04
JP    01158218 A  *  6/1989   ............. F16C 17/08

OTHER PUBLICATIONS

International Search Report and Written Opinion in International Patent Application No. PCT/US2019/043668, dated Sep. 16, 2019, 11 pgs.

* cited by examiner

*Primary Examiner* — Phillip A Johnson
(74) *Attorney, Agent, or Firm* — Wood Herron & Evans LLP

(57) ABSTRACT

A hydrodynamic thrust bearing pad includes a composite laminate including at least one ply including a plurality of fibers oriented in at least one direction, and a bearing surface configured to confront a rotating thrust surface of a rotating shaft for transmitting axial thrust loads from the rotating shaft to the composite laminate. The bearing pad also includes a support surface configured to confront a stationary surface of a stationary housing for transmitting the axial thrust loads from the composite laminate to the stationary housing, and at least one side surface extending between the bearing and support surfaces. The at least one ply is configured to expand non-uniformly when heated from a first (Continued)

temperature to a second temperature for causing the composite laminate to warp from an unstressed state to a stressed state.

20 Claims, 6 Drawing Sheets

(51) Int. Cl.
*F16C 17/24* (2006.01)
*F16C 33/20* (2006.01)

HYDRODYNAMIC THRUST BEARING PAD HAVING A VARIABLE TAPER, AND RELATED SYSTEMS AND METHODS

CROSS-REFERENCE TO RELATED APPLICATIONS

This application claims the benefit of U.S. Provisional Application Ser. No. 62/711,166 filed on Jul. 27, 2018, the disclosure of which is expressly incorporated by reference herein in its entirety.

TECHNICAL FIELD

The invention relates to bearings and, more particularly, to hydrodynamic thrust bearings made of composite materials.

BACKGROUND

Bearings are well-known mechanical devices that handle load and, in parallel, reduce friction between moving components. Such reduction in friction allows a bearing to aid a system in either rotational or linear movement. Hydrodynamic thrust bearings are a particular type of bearing that support thrust or axial load by forcing a dynamic lubricant through converging surfaces in relative motion to reduce friction due to such relative motion among mechanical components/assembly.

In this regard, conventional hydrodynamic thrust bearings are configured to hydraulically transmit axial thrust loads from a shaft to an adjacent stationary support structure. A hydrodynamic thrust bearing assembly typically includes a propulsion shaft having a radial thrust flange secured thereto; a housing enclosing and supporting the shaft with a stationary housing member axially spaced apart from the thrust flange; and a plurality of bearing pads disposed between the rotating thrust flange and the stationary housing member for transmitting thrust loads therebetween. A hydrodynamic lubricant film is maintained between the rotating thrust flange and the bearing surface of the bearing pads to allow the thrust flange to rotate freely, in spaced relationship, over the bearing surfaces and effectively transmit thrust loads thereto through the lubricating film.

Hydrodynamic thrust bearings perform the above function by developing an oil film. Such bearings having fixed bearing pads, while developing the oil film, primarily support load in the axial direction of the shaft or other mechanical components/assembly. The oil is introduced through grooves provided between the pads and moves into the spacing between the bearing surfaces of the pads and the opposing surface of the rotating thrust flange. In order to facilitate this entry of the oil, a permanent taper contour is typically cut, machined, or otherwise pre-formed along an edge of each pad to provide a gap therebetween for the oil to flow through. A typical single 60 mm square steel bearing pad having a thickness of 4.5 mm usually has a taper depth of 0.03 mm to perform its function. Such contours usually require expensive machining operations and, once cut on the surface of the pad, cannot be reshaped. In some cases, the taper contour is provided along only a single edge of each pad to minimize cost, for example. However, such bearing assemblies are only suitable for allowing rotation in a single direction. Additional machining is needed to cut taper contours on both sides of the pads to achieve bi-directional rotation capability.

The tapered contour facilitates the introduction of lubricating oil between the moving surfaces in the bearing, which is important to its performance. However, during service, the lubricating oil is inevitably heated by friction which reduces the oil film thickness, thereby increasing surface wear and thus increasing the risk of failure. In this regard, there are two main causes of thrust bearing failure: thermos-elastic instabilities (TEI) and thermo-viscous distress (TVD). Thermos-elastic instabilities result from two surfaces making direct contact, creating excess friction that is then dissipated as heat. This contact spot is commonly referred to as a hotspot, due to its increased temperature, and can cause bearing failure in two ways: wearing of a protruded bearing or, in cases of extreme temperatures, the creation of a contact weld. Failure resulting from thermos-viscous distress is caused by the large increase in temperature upon creation of a hotspot. The increase in temperature results in a decrease in the dynamic lubricant's viscosity, described as the lubricant's ability to resist shear deformation. This reduction in the lubricant's ability to resist shear deformation causes the fluid to be unable to handle the axial load, resulting in total system failure.

Therefore, it would be desirable to provide an improved hydrodynamic thrust bearing which avoids the need to cut, machine, or otherwise pre-form a permanent taper along the edge of each bearing pad, and which allows the configuration of the bearing pad to be manipulated during operation to minimize friction and thereby reduce surface wear and the risk of failure.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

In one embodiment a hydrodynamic thrust bearing pad includes a composite laminate including at least one ply including a plurality of fibers oriented in at least one direction, and a bearing surface configured to confront a rotating thrust surface of a rotating shaft for transmitting axial thrust loads from the rotating shaft to the composite laminate. The bearing pad also includes a support surface configured to confront a stationary surface of a stationary housing for transmitting the axial thrust loads from the composite laminate to the stationary housing, and at least one side surface extending between the bearing and support surfaces. The at least one ply is configured to expand non-uniformly when heated from a first temperature to a second temperature for causing the composite laminate to warp from an unstressed state to a stressed state.

The at least one ply may include a first plurality of fibers oriented in a first direction and a second plurality of fibers oriented in a second direction different from the first direction. In one embodiment, the at least one ply includes a single ply including the first and second pluralities of fibers within a single matrix, wherein a first portion of the single ply is configured to expand in an expansion direction by a first length when heated from the first temperature to the second temperature, and wherein a second portion of the single ply is configured to expand in the expansion direction by a second length different from the first length when heated from the first temperature to the second temperature, such that the difference between the first and second lengths causes the composite laminate to warp from the unstressed state to the stressed state. In another embodiment, the at least one ply includes a first ply including the first plurality of fibers within a first matrix and a second ply including the second plurality of fibers within a second matrix, wherein the first ply is configured to expand in an expansion direction by a first length when heated from the first temperature to the second temperature, and wherein the second ply is configured to expand in the expansion direction by a second length different from the first length when heated from the first temperature to the second temperature, such that the difference between the first and second lengths causes the composite laminate to warp from the unstressed state to the stressed state. The first plurality of fibers and the second plurality of fibers may include a same fiber material, and the first matrix and the second matrix may include a same matrix material.

In addition or alternatively, the bearing surface may be planar when the composite laminate is in the unstressed state, and the bearing surface may be at least partially curved when the composite laminate is in the stressed state. For example, the bearing surface may be at least partially concave when the composite laminate is in the stressed state. In addition or alternatively, when the composite laminate is in the unstressed state, the bearing surface may reside in a plane, and when the composite laminate is in the stressed state, at least a portion of the bearing surface may be displaced in a displacement direction perpendicular to the plane. For example, when the composite laminate is in the stressed state, at least a portion of the bearing surface may be displaced in the displacement direction by at least 0.03 mm. In one embodiment, the at least one side surface is planar and perpendicular to the bearing and support surfaces when the composite laminate is in the unstressed state, and the at least one side surface is tapered between and non-orthogonal to the bearing and support surfaces when the composite laminate is in the stressed state.

In another embodiment, a hydrodynamic thrust bearing assembly includes a rotatable shaft, a thrust surface fixedly coupled to the rotatable shaft for rotation therewith, and a stationary surface spaced apart from the thrust surface. The bearing assembly also includes a plurality of circumferentially-spaced hydrodynamic thrust bearing pads each including a bearing surface and a support surface, and positioned between the thrust surface and the stationary surface such that the bearing surface confronts the thrust surface and the support surface confronts the stationary surface. Each bearing pad is configured to warp from an unstressed state in which lubricant is prevented from entering between the bearing surfaces and the thrust surface, to a stressed state in which lubricant is permitted to enter between the bearing surfaces and the thrust surface, when heated from a first temperature to a second temperature. Each bearing surface may be planar when the respective bearing pad is in the unstressed state, and each bearing surface may be at least partially curved when the respective bearing pad is in the stressed state. In one embodiment, each bearing pad includes at least one side surface, wherein the side surfaces are perpendicular to the respective bearing and support surfaces and parallel to each other when the bearing pads are in the unstressed state, and wherein the side surfaces are non-orthogonal to the respective bearing and support surfaces and angled relative to each other when the bearing pads are in the stressed state. In addition or alternatively, at least a portion of each of the bearing surfaces may be displaced in a displacement direction away from the thrust surface to permit lubricant to enter between the bearing surfaces and the thrust surface, when the bearing pads are in the stressed state. The bearing pads may be configured to be heated from the first temperature to the second temperature by movement of the rotatable shaft.

In yet another embodiment, a method of operating a hydrodynamic thrust bearing assembly including a rotatable shaft, a thrust surface fixedly coupled to the rotatable shaft for rotation therewith, a stationary surface spaced apart from the thrust surface, and a plurality of circumferentially-spaced hydrodynamic thrust bearing pads each including a bearing surface and a support surface and positioned between the thrust surface and the stationary surface such that the bearing surface confronts the thrust surface and the support surface confronts the stationary surface is provided. The method includes maintaining each bearing pad in an unstressed state in which lubricant is prevented from entering between the bearing surfaces and the thrust surface, warping each bearing pad from the unstressed state to a stressed state in which the lubricant is permitted to enter between the bearing surfaces and the thrust surface, directing the lubricant between the bearing surfaces and the thrust surface, and transmitting axial thrust loads from the rotatable shaft to the stationary surface via the bearing pads and the lubricant. Warping each bearing pad may include heating each bearing pad from a first temperature to a second temperature. For example, heating each bearing pad from the first temperature to the second temperature may include moving the rotatable shaft. In addition or alternatively, warping each bearing pad may include displacing at least a portion of each of the bearing surfaces away from the thrust surface to permit lubricant to enter between the bearing surfaces and the thrust surface. The method may further include returning each bearing pad to the unstressed state.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As set forth in greater detail below, a new type of bearing with improved performance is provided wherein the bearing pad profile can be controlled during operation. In this regard, the present invention may completely eliminate the pre-formed taper on the bearing pads of hydrodynamic thrust bearings, and may instead exploit the thermal expansion properties of composite laminate to introduce a variable taper on the surface of the bearing pad during service. Using the thermal properties to control the taper may provide an "automatic self-actuated control" which does not require sensors or actuators.

Figure 1:
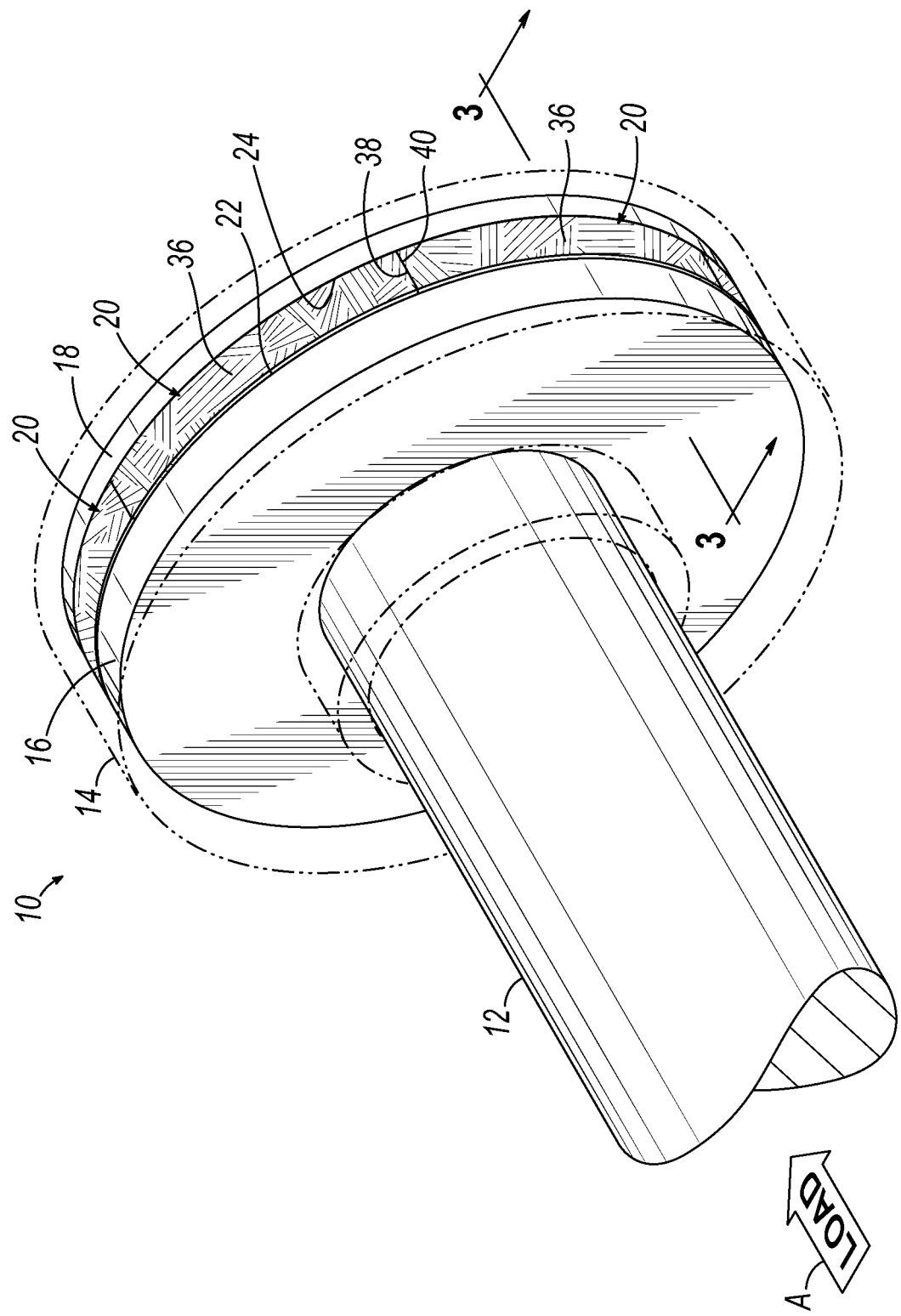
FIG. 1 is a partial perspective view of an exemplary hydrodynamic thrust bearing assembly in accordance with an aspect of the invention.
Figure 2:
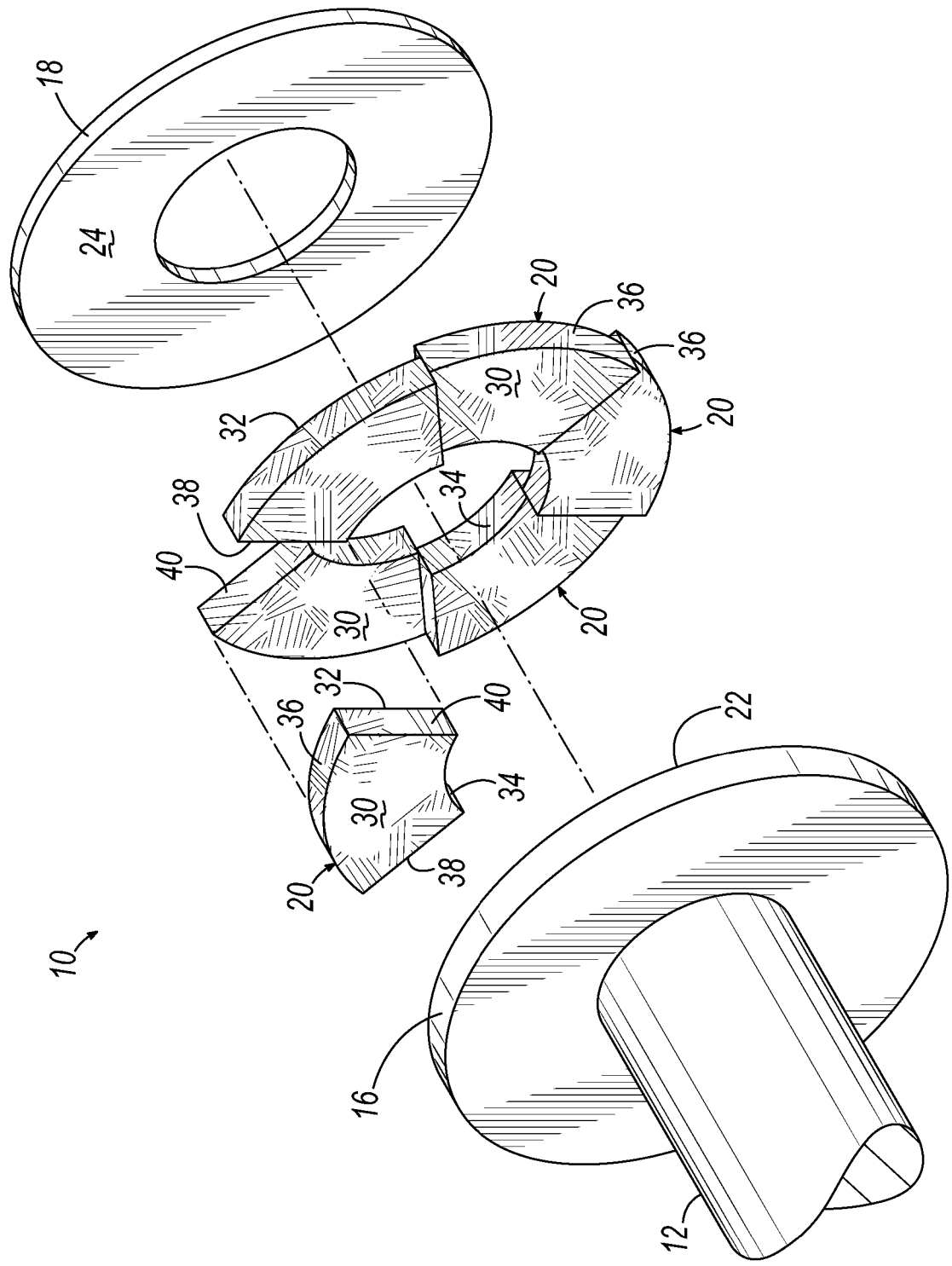
FIG. 2 is a partial disassembled view of the hydrodynamic thrust bearing assembly of FIG. 1, showing the hydrodynamic thrust bearing pads of the assembly.

Referring now to FIGS. 1 and 2, an exemplary hydrodynamic thrust bearing assembly 10 is shown in accordance with an aspect of the invention. The illustrated assembly 10 includes a propulsion shaft 12 rotatably supported and at least partially enclosed by a stationary housing 14. A radial thrust flange 16 is fixedly coupled to the propulsion shaft 12 for rotation therewith, and is axially spaced apart from a stationary support or disc 18 fixedly coupled to the stationary housing 14. As shown, a plurality of circumferentially-spaced segmental bearing pads 20 are disposed between the rotating thrust flange 16 and the stationary disc 18 for transmitting thrust loads therebetween, as indicated by the arrow A. A hydrodynamic lubricant film L (FIGS. 3 and 4) is maintained between the rotating thrust flange 16 and the bearing pads 20 to allow the thrust flange 16 to rotate freely, in spaced relationship, over the bearing pads 20 and effectively transmit thrust loads thereto through the lubricating film L. As described in greater detail below, rather than including permanently machined or otherwise pre-formed tapers, each of the bearing pads 20 is configured to at least partially deform or warp at certain temperature loads to assume one or more predetermined profiles with one or more selectively formed or variable tapers along the edges thereof and/or a height displacement away from the thrust flange 16 to facilitate entry of the lubricant film L between the bearing pads 20 and the thrust flange 16 in a controlled and adjustable manner.

Figure 3:
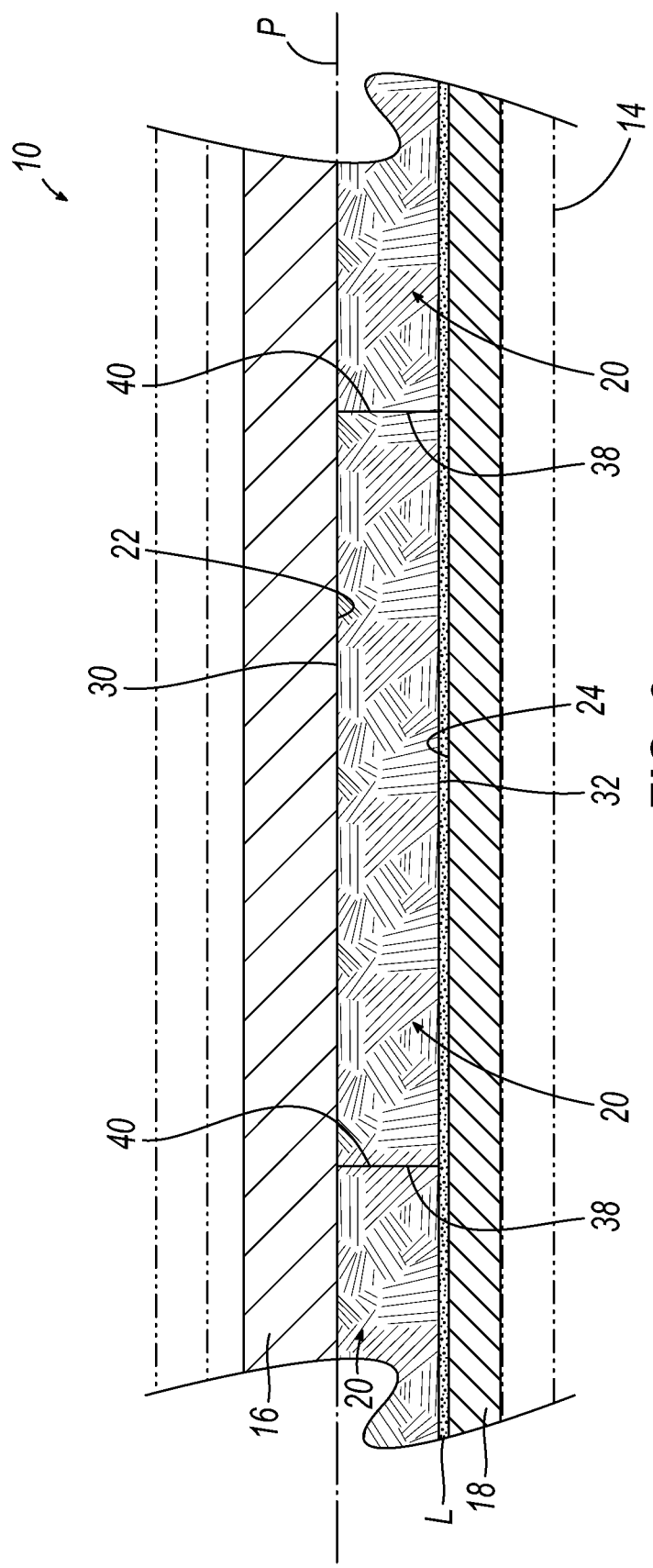
FIG. 3 is a partial cross sectional view of the hydrodynamic thrust bearing assembly of FIG. 1, taken along section line 3-3 in FIG. 1, showing the hydrodynamic thrust bearing pads in an unstressed state.

With continuing reference to FIGS. 1 and 2, and as best shown in FIG. 3, the illustrated thrust flange 16 includes a planar thrust surface 22 and the illustrated stationary disc 18 includes an opposing planar stationary surface 24 spaced apart from each other to receive the bearing pads 20 and lubricant L therebetween.

Referring now primarily to FIGS. 2 and 3, Each of the illustrated bearing pads 20 has a truncated circular sector shape and includes a bearing surface 30 confronting the thrust surface 22 of the thrust flange 16 and a support surface 32 confronting the stationary surface 24 of the stationary disc 18. The bearing and support surfaces 30, 32 each intersect and extend between radially inner and outer surfaces 34, 36, and first and second side surfaces 38, 40. In one embodiment, at least a portion of each support surface 32 may be fixed against movement relative to the stationary surface 24 of the stationary disc 18. For example, peripheral portions of each support surface 32 at or near the respective radially inner and/or outer surface 34, 36, such as at or near the edges therebetween, may be fixed against movement relative to the stationary surface 24 either directly or indirectly (e.g., via the housing 14).

Each bearing surface 30 is configured to be selectively lubricated by the lubricant L and is disposed in sliding relationship with the thrust surface 22 such that thrust loads may be effectively transmitted between the thrust flange 16 and the bearing pads 20. The hydrodynamic oil film L formed between each bearing surface 30 and the thrust surface 22 may be configured to generate an oil pressure of sufficient magnitude to prevent material contact between the thrust flange 16 and the bearing pads 20 while thrust pressures are transmitted to the bearing pads 20 and, subsequently, to the stationary disc 18.

As shown in FIG. 3, when the bearing pads 20 are each in the illustrated undeformed or unstressed state, the bearing and support surfaces 30, 32 may each be planar, while the radially inner and outer surfaces 34, 36 may each be arcuate, and the first and second side surfaces 38, 40 may each be planar. More particularly, each of the bearing surfaces 30 may reside in or collectively define a plane P. Furthermore, when in the unstressed state, the bearing surface 30 of each bearing pad 20 may engage or abut the thrust surface 22 of the thrust flange 16 and may be oriented parallel thereto, and the first and second side surfaces 38, 40 of each bearing pad 20 may engage or abut the first and/or second side surfaces 38, 40 of each adjacent bearing pad 20 and may be oriented parallel thereto and perpendicular to the bearing and support surfaces 30, 32. Thus, the lubricant L may be inhibited from entering between the bearing surfaces 30 and the thrust surface 22 when the bearing pads 20 are in the unstressed state.

Figure 4:
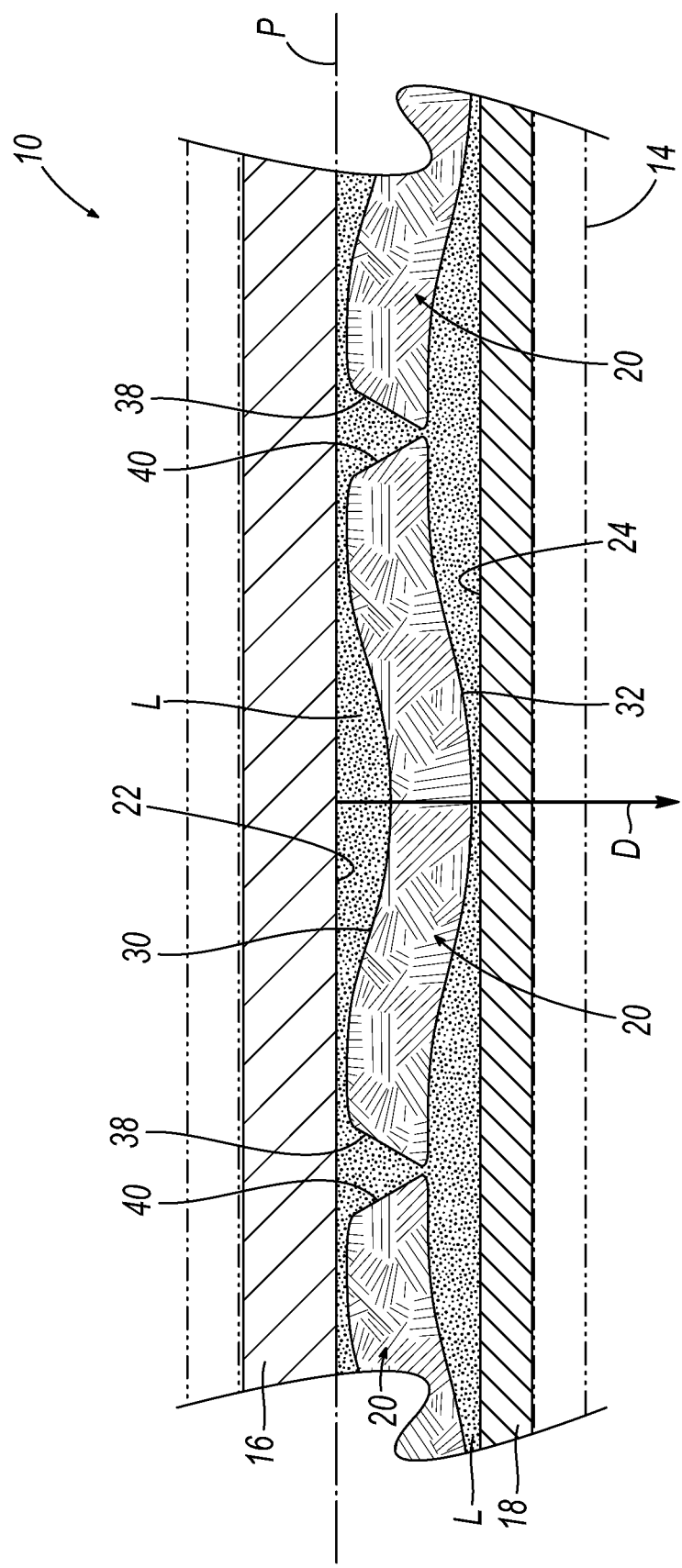
FIG. 4 is a partial cross sectional view similar to FIG. 3, showing the hydrodynamic thrust bearing pads in a stressed state.

To facilitate entry of the lubricant L between the bearing surfaces 30 and the thrust surface 22, the bearing pads 20 may each be deformed or warped from the unstressed state shown in FIG. 3 to one or more stressed states, such as that shown in FIG. 4. Such deformation may occur during operation of the assembly 10, such as during rotation of the shaft 12 and accompanying thrust flange 16. For example, the operation of the assembly 10 may apply a thrust load and, consequently, a temperature load to each bearing pad 20 and, more particularly, to the bearing surface 30 of each bearing pad 20. The applied temperature load may heat the bearing pads 20 from a first temperature to a second temperature and thereby induce a selectively formed taper curvature and/or height displacement away from the thrust surface 22 in each of the bearing pads 20.

In this regard, and referring now to FIG. 4, when the bearing pads 20 are each in the illustrated stressed state, the first and second side surfaces 38, 40 of each bearing pad 20 may be at least partially tapered to allow entry of the lubricant L between the first and second side surfaces 38, 40 of each set of adjacent bearing pads 20, and the bearing surface 30 of each bearing pad 20 may be at least partially curved to allow entry of the lubricant L between the bearing surfaces 30 and the thrust surface 22.

More particularly, each bearing surface 30 may be at least partially concave when the bearing pads 20 are in the stressed state. As shown, when the bearing pads 20 are in the stressed state, at least a portion of each bearing surface 30 is displaced in a displacement direction D perpendicular to the plane P in which the bearing surfaces 30 reside in the unstressed state (FIG. 3). For example, at least a portion of each bearing surface 30 may be displaced in the displacement direction D by at least 0.03 mm, such that the curvature of the bearing surface 30 may be sufficient to allow oil to enter through the resulting gap and develop the oil film L. In the embodiment shown, the first and second side surfaces 38, 40 of each bearing pad 20 are tapered between and non-orthogonal to the bearing and support surfaces 30, 32 when the bearing pads 20 are in the stressed state, to assist in allowing oil to enter between the bearing surfaces 30 and the thrust surface 22.

As described in greater detail below, the particular contour of each bearing pad 20 may be selectively manipulated during operation of the bearing assembly 10 to minimize friction. In other words, each bearing pad 20 may be incrementally or continuously deformed or warped to various additional stressed states by applying different temperature loads to selectively adjust the profile of each bearing pad 20 to achieve a desired configuration for minimizing friction. Ultimately, each bearing pad 20 may be returned to the unstressed state (FIG. 3) by removing the applied thermal load, such as by halting operation of the bearing assembly 10.

Figure 5:
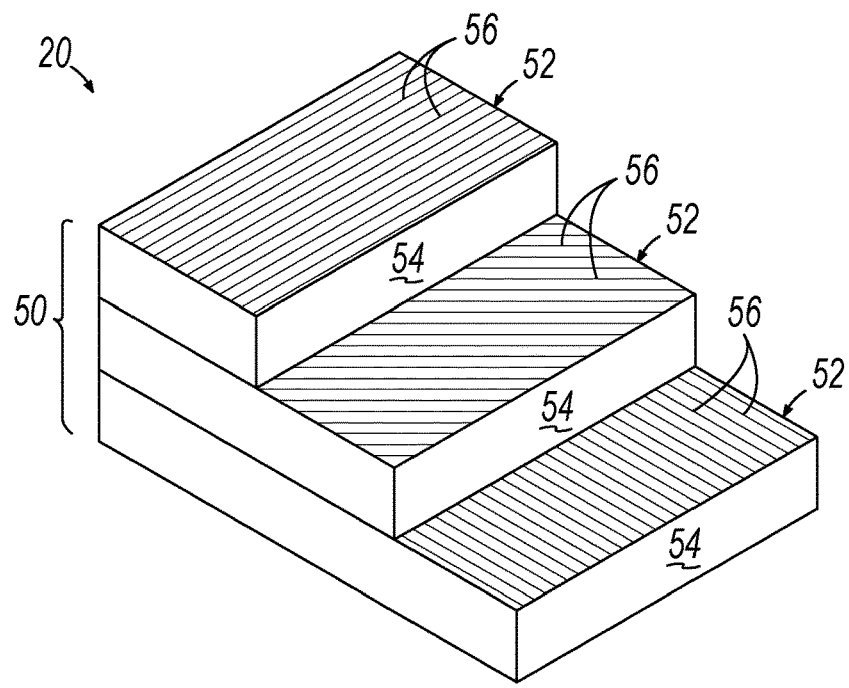
FIG. 5 is a schematic view of a three-ply laminate forming a hydrodynamic thrust bearing pad in accordance with an aspect of the invention.

Referring now to FIG. 5, the thermally-induced taper curvature of the bearing pads 20 may be achieved by constructing each bearing pad 20 of one or more composite materials such as, for example, carbon/epoxy (IM7/977-3), PTFE-filled Delrin acetal resin, and/or MDS-filled nylon.

Each composite bearing pad 20 may include a laminate 50 with multiple fiber reinforced matrix layers or plies 52. The laminate 50 may be configured to deform during expansion due to anisotropic expansion of the plies 52. The resulting deformed surfaces 30, 32, 34, 36, 38, 40 of the bearing pad 20 may allow the bearing assembly 10 to function while avoiding solid-to-solid contact between the bearing surfaces 30 of the bearing pads 20 and the thrust surface 22 of the thrust flange 16. In one embodiment, controlling the profile of each bearing pad 20 during operation provides the bearing assembly 10 with highly superior qualities. For example, using the thermal properties to control the selectively formed taper produces an automatic self-actuated control which does not require sensors or actuators.

In the embodiment shown, the illustrated laminate 50 at least partially forming the bearing pad 20 includes three plies 52 of composite material. Each ply 52 includes a homogeneous matrix 54 encapsulating a plurality of fibers 56 extending in a single direction, such that each ply 52 may be considered unidirectional. Thus, each ply 52 may have three coefficients of thermal expansion, which may be different in value. While each individual ply 52 may undergo changes in dimension upon heating without any substantial warping, the illustrated laminate 50 made with identical plies 52 at different orientations may tend to warp upon heating because the length change in each direction may be different for each ply 52.

In this regard, each of the plies 52 may be configured to expand in the same expansion direction by different lengths when heated from the first temperature to the second temperature, such that the difference between the expansion lengths causes the laminate 50 to warp from the unstressed state (FIG. 3) to the at least one stressed state (FIG. 4). In the embodiment shown, each of the plies 52 is unidirectional, with the fibers 56 of each ply arranged in a different direction from the fibers 56 of the remaining plies 52. More particularly, the plies 52 are stacked in a [0/45/90] arrangement. In addition, the fibers 56 of all of the plies 52 may be constructed of a same fiber material, and the matrices of all of the plies 52 may be constructed of a same matrix material. Thus, the differing orientations of the plies 52 may promote the non-uniform expansions of the plies 52 for facilitating the warping of the laminate 50.

The plies 52 of each bearing pad 20 may be selected and arranged to provide a desired displacement profile when the bearing pad 20 is heated, such as during operation, from the first temperature to at least the second temperature based on the non-uniform expansions of the various plies 52 in the laminate 50. In this regard, the below constitutive equation may be solved for the whole laminate 50 (e.g., using a numerical solver) to determine the displacement over the whole plane of the laminate 50:

$$\in_{ij} = \alpha_{ij} \Delta T$$

where $\in_{ij}$ is the strain tensor, $\alpha_{ij}$ is the coefficients of thermal expansion in different directions, and $\Delta T$ is the temperature change (e.g., the difference between the first and second temperatures). The laminate 50 may then be modeled to include a sufficient number of plies 52 with particular configurations to provide the desired displacement profile with a sufficient height displacement for allowing entry of the lubricant L between the bearing surface 30 and the thrust surface 22 during operation. In one embodiment, the laminate 50 may be designed using finite element analysis and/or computer aided engineering software, such as that commercially available under the trademark Abaqus FEA.

In one embodiment, the laminate 50 may define at least some of the various surfaces 30, 32, 34, 36, 38, 40 of the respective bearing pad 20. For example, an upper surface of the topmost ply 52 of the laminate 50 may define the bearing surface 30 of the bearing pad 20 and a lower surface of the bottommost ply 52 of the laminate 50 may define the support surface 32 of the bearing pad 20. In addition or alternatively, the laminate 50 may be attached to, or otherwise constrained by, a substrate (not shown) for limiting movement of the laminate 50 during operation of the bearing assembly 10. Such a modification may be incorporated in the design process by using proper boundary conditions in the software model.

While the illustrated differing orientations of the plies 52 and, more particularly, the differing orientations of the fibers 56 thereof, promote the non-uniform expansions of the plies 52 for facilitating the warping of the laminate 50, the warping of the laminate 50 may be facilitated and/or adjusted by various other characteristics of the laminate 50 and/or plies 52. In this regard, the shape of the thermally-induced curvature of each bearing pad 20 during the operation of the bearing assembly 10 can be controlled through a variety of factors including stack sequence of the plies 52, thickness(es) of the plies 52, orientation(s) of the fibers 56, type(s) of the fibers 56, material type(s) of the matrices 54, and other variables, based on the desired temperature profile and distribution of the bearing pad 20. Therefore, the configuration of each bearing pad 20 during operation can be optimized based on the expected thermal loading that the bearing pad 20 will experience during operation.

While the illustrated laminate 50 includes three plies 52, the laminate 50 may alternatively include any suitable number of plies 52. For example, the laminate 50 may include only a single ply 52, two plies 52, or more than three plies 52. In one embodiment wherein the laminate 50 includes only a single ply 52, the single ply 52 may have a first set of fibers 56 arranged in a first direction and a second set of fibers 56 arranged in a second direction different from the first direction in the matrix 54 (e.g., in relative orientations similar to those shown herein for multiple plies 52). For example, the single ply 52 may include a woven fabric. In this case, the differing orientations of the fibers 56 within the single ply 52 may promote the non-uniform expansion for facilitating the desired thermally-induced warping of the laminate 50. More particularly, different portions of the single ply 52 may be configured to expand in the same expansion direction by different lengths when heated from the first temperature to the second temperature, such that the difference between the expansion lengths causes the laminate 50 to warp from the unstressed state (FIG. 3) to the at least one stressed state (FIG. 4). Thus, a result similar to that described above may be achieved using only a single ply 52.

It will be appreciated that the rotatable shaft 12 may be incorporated into any suitable propulsion system, piece of equipment, machinery, or other operating environment such as, for example, a pump, a compressor, a turbocharger, a wind turbine, or an electric motor.

Example 1

The details of numerical studies conducted using the Abaqus FBA software are presented below.

A single 60 mm square composite laminate pad was the subject of the study. The top surface was in contact with the bearing body and bottom surface was in contact with the oil. All boundary conditions were defined on the bottom surface. The pad was fixed from either sides (5 mm×50 mm side contact areas) and front and back edges in contact with the bearing body were constrained to move in the Z direction. An oil film pressure of 1.67 bar was applied on the 50 mm square contact area, whereas, a temperature load of 373 K was applied on 8 mm wide and 60 mm long contact area and rest of the area was kept at 273 K.

The properties of the composite material assigned are listed in Table 1. The laminate lay-up for the pad was a [0/45/90] stack with 3 plies (as shown in FIG. 5). Each ply was 1.5 mm thick giving a total pad thickness of 4.5 mm. The pad was discretized using coupled temperature-displacement quadrilateral elements of a quadratic order.

TABLE 1

Material properties of Carbon/Epoxy (IM7/977-3)

| Property | Carbon/Epoxy (1M7/977-3) |
|---|---|
| Density (g/cm$^3$) | 1.61 |
| Longitudinal Modulus (GPa) | 190 |
| Transverse Modulus (GPa) | 9.9 |
| In-Plane Shear Modulus (GPa) | 7.8 |
| Major Poisson's Ratio | 0.35 |
| Longitudinal Tensile Strength (MPa) | 3250 |
| Transverse Tensile Strength (MPa) | 62 |
| In-Plane Shear Strength (MPa) | 75 |

TABLE 1-continued

Material properties of Carbon/Epoxy (IM7/977-3)

| Property | Carbon/Epoxy (1M7/977-3) |
|---|---|
| Longitudinal Compressive Strength (MPa) | 1590 |
| Transverse Compressive Strength (MPa) | 200 |
| Longitudinal Thermal Expansion Coefficient ($10^{-6}$/° C.) | −0.9 |
| Transverse Thermal Expansion Coefficient ($10^{-6}$/° C.) | 22 |
| Thermal Conductivity | 0.75 |

Figure 6:
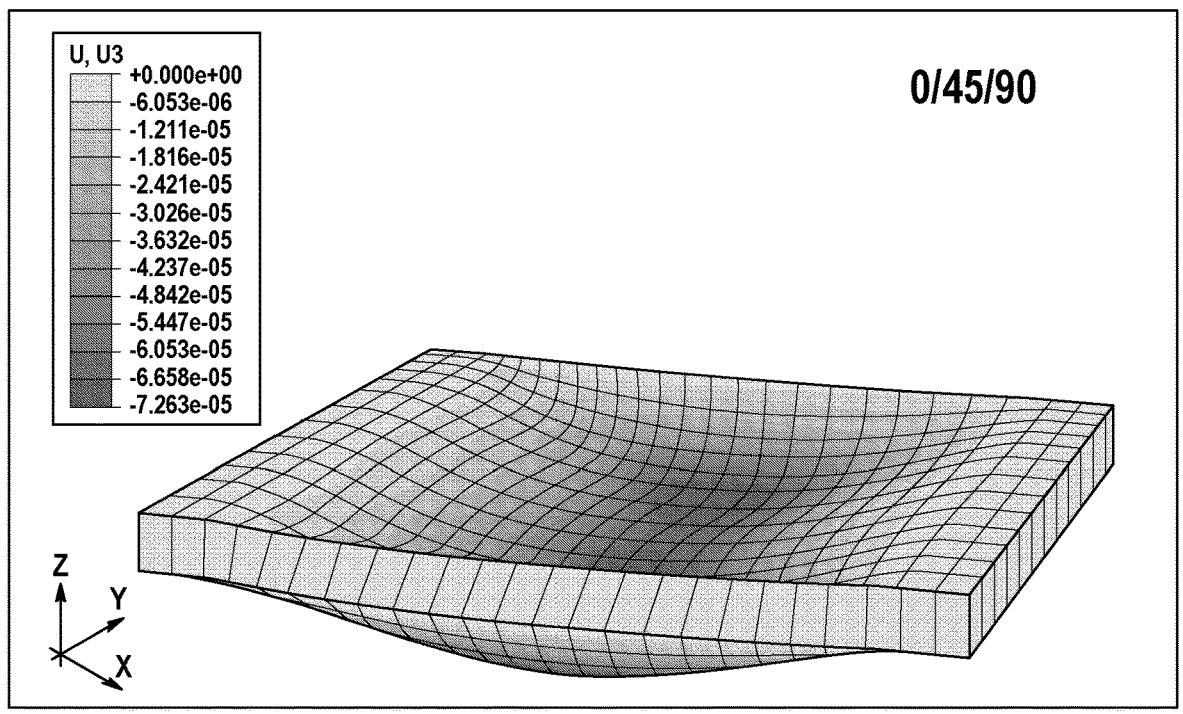
FIG. 6 is a perspective view of an alternative hydrodynamic thrust bearing pad, showing a thermally-induced taper curvature in the bearing pad, in accordance with a first example.

FIG. 6 shows the results of thermo-mechanical coupled analysis of the bearing pad. The curvature of the pad is evident with maximum thermally induced height displacement in the Z direction of 0.0726 mm. As described above, a typical steel bearing pad of similar size usually has a taper depth of 0.03 mm to perform its function of allowing lubricant entry. Thus, the curvature introduced by thermal expansion of the composite laminate pad may be considered sufficient to allow oil to enter through the resulting gap and develop oil film at operating rotational velocities. As shown, the curvature is bidirectional, which allows rotation in either direction. Further as the load increases, the temperature will rise, and higher curvature will be achieved causing more oil to enter facilitating more stable oil film. Conversely, as the load decreases, the temperature will lower, and less curvature will be achieved causing less oil to enter to avoid undesirable fluid friction while maintaining at least a minimum film thickness. In other words, the bearing pad may self-govern for achieving an appropriate film thickness based on the load.

Example 2

Figure 7:
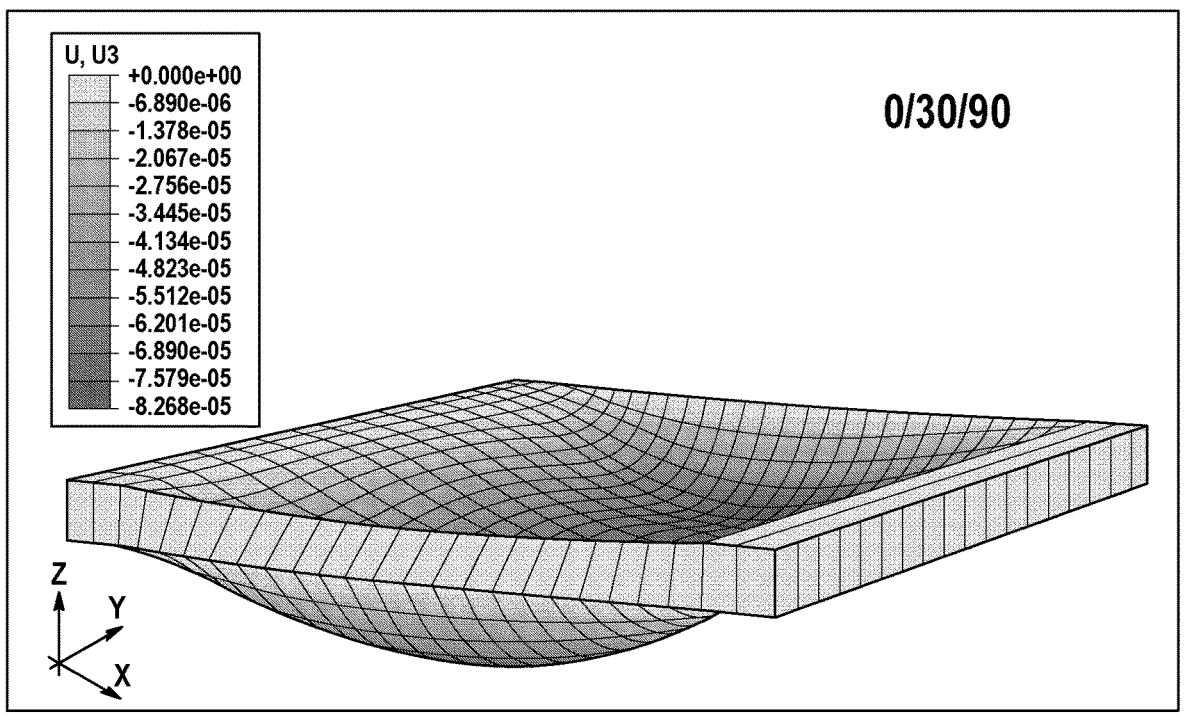
FIG. 7 is a perspective view of an alternative hydrodynamic thrust bearing pad, showing a thermally-induced taper curvature in the bearing pad, in accordance with a second example.

FIG. 7 shows the results of thermo-mechanical coupled analysis of another bearing pad, wherein three plies are arranged in a [0/30/90] stack. The remaining aspects of the bearing pad and plies may be similar or identical to those described above with respect to the FIG. 6, including the materials, size, and load. As shown, there is significant displacement and curvature along the Z direction, and the maximum height displacement in the Z direction is 0.0827 mm.

Example 3

Figure 8:
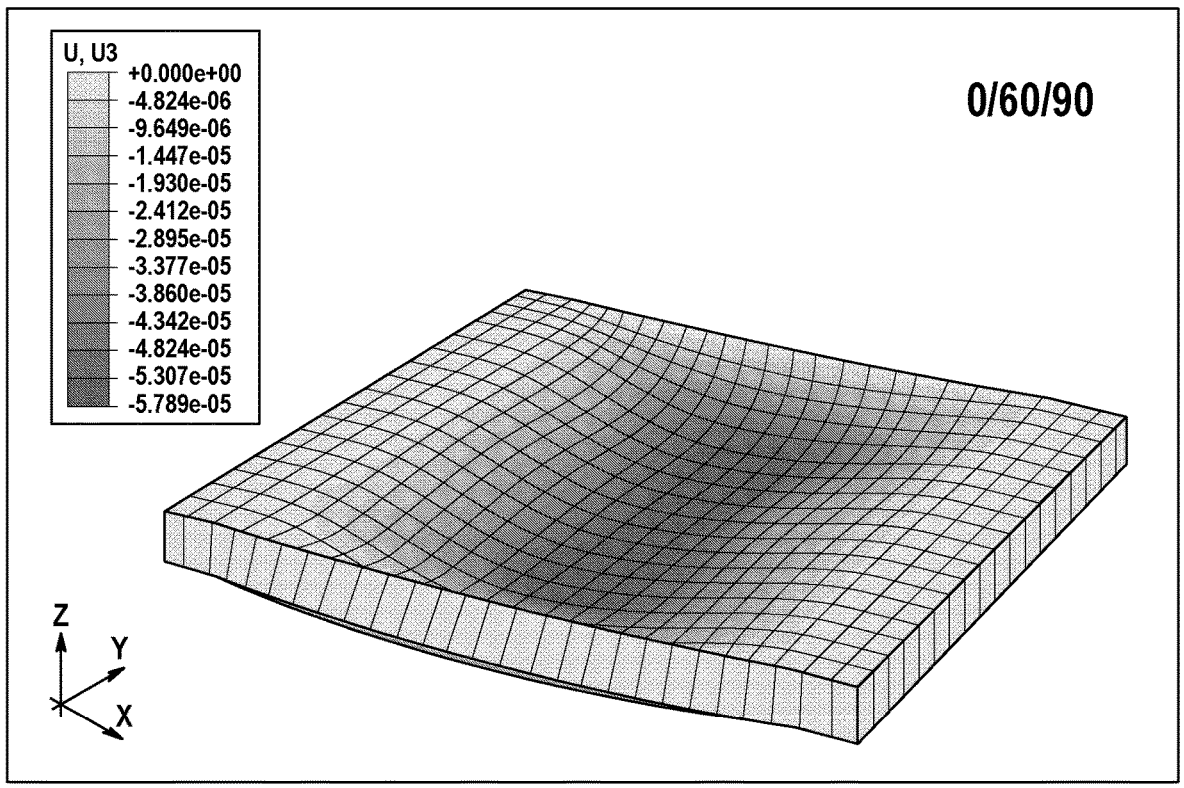
FIG. 8 is a perspective view of an alternative hydrodynamic thrust bearing pad, showing a thermally-induced taper curvature in the bearing pad, in accordance with a third example.

FIG. 8 shows the results of thermo-mechanical coupled analysis of another bearing pad, wherein three plies are arranged in a [0/60/90] stack. The remaining aspects of the bearing pad and plies may be similar or identical to those described above with respect to the FIG. 6, including the materials, size, and load. As shown, there is significant displacement and curvature along the Z direction, and the maximum height displacement in the Z direction is 0.0579 mm.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user.

What is claimed is:

1. A hydrodynamic thrust bearing pad comprising:
a composite laminate including at least one ply including a plurality of fibers oriented in at least one direction;
a bearing surface configured to confront a rotating thrust surface of a rotating shaft for transmitting axial thrust loads from the rotating shaft to the composite laminate;
a support surface configured to confront a stationary surface of a stationary housing for transmitting the axial thrust loads from the composite laminate to the stationary housing; and
at least one side surface extending between the bearing and support surfaces,
wherein the at least one ply is configured to expand non-uniformly when heated from a first temperature to a second temperature for causing the composite laminate to warp from an unstressed state to a stressed state.

2. The hydrodynamic thrust bearing pad of claim 1, wherein the at least one ply includes a first plurality of fibers oriented in a first direction and a second plurality of fibers oriented in a second direction different from the first direction.

3. The hydrodynamic thrust bearing pad of claim 2, wherein the at least one ply includes a single ply including the first and second pluralities of fibers within a single matrix, wherein a first portion of the single ply is configured to expand in an expansion direction by a first length when heated from the first temperature to the second temperature, and wherein a second portion of the single ply is configured to expand in the expansion direction by a second length different from the first length when heated from the first temperature to the second temperature, such that the difference between the first and second lengths causes the composite laminate to warp from the unstressed state to the stressed state.

4. The hydrodynamic thrust bearing pad of claim 2, wherein the at least one ply includes a first ply including the first plurality of fibers within a first matrix and a second ply including the second plurality of fibers within a second matrix, wherein the first ply is configured to expand in an expansion direction by a first length when heated from the first temperature to the second temperature, and wherein the second ply is configured to expand in the expansion direction by a second length different from the first length when heated from the first temperature to the second temperature, such that the difference between the first and second lengths causes the composite laminate to warp from the unstressed state to the stressed state.

5. The hydrodynamic thrust bearing pad of claim 4, wherein the first plurality of fibers and the second plurality of fibers include a same fiber material, and wherein the first matrix and the second matrix include a same matrix material.

6. The hydrodynamic thrust bearing pad of claim 1, wherein the bearing surface is planar when the composite laminate is in the unstressed state, and wherein the bearing surface is at least partially curved when the composite laminate is in the stressed state.

7. The hydrodynamic thrust bearing pad of claim 6, wherein the bearing surface is at least partially concave when the composite laminate is in the stressed state.

8. The hydrodynamic thrust bearing pad of claim 6, wherein, when the composite laminate is in the unstressed state, the bearing surface resides in a plane, and when the composite laminate is in the stressed state, at least a portion of the bearing surface is displaced in a displacement direction perpendicular to the plane.

9. The hydrodynamic thrust bearing pad of claim 8, wherein, when the composite laminate is in the stressed state, at least a portion of the bearing surface is displaced in the displacement direction by at least 0.03 mm.

10. The hydrodynamic thrust bearing pad of claim 1, wherein the at least one side surface is planar and perpendicular to the bearing and support surfaces when the composite laminate is in the unstressed state, and wherein the at least one side surface is tapered between and non-orthogonal to the bearing and support surfaces when the composite laminate is in the stressed state.

11. A hydrodynamic thrust bearing assembly, comprising:
a rotatable shaft;
a thrust surface fixedly coupled to the rotatable shaft for rotation therewith;
a stationary surface spaced apart from the thrust surface; and
a plurality of circumferentially-spaced hydrodynamic thrust bearing pads each including a bearing surface and a support surface, and positioned between the thrust surface and the stationary surface such that the bearing surface confronts the thrust surface and the support surface confronts the stationary surface,
wherein each bearing pad is configured to warp from an unstressed state in which lubricant is prevented from entering between the bearing surfaces and the thrust surface, to a stressed state in which lubricant is permitted to enter between the bearing surfaces and the thrust surface, when heated from a first temperature to a second temperature.

12. The hydrodynamic thrust bearing assembly of claim 11, wherein each bearing surface is planar when the respective bearing pad is in the unstressed state, and wherein each bearing surface is at least partially curved when the respective bearing pad is in the stressed state.

13. The hydrodynamic thrust bearing assembly of claim 11, wherein each bearing pad includes at least one side surface, wherein the side surfaces are perpendicular to the respective bearing and support surfaces and parallel to each other when the bearing pads are in the unstressed state, and wherein the side surfaces are non-orthogonal to the respective bearing and support surfaces and angled relative to each other when the bearing pads are in the stressed state.

14. The hydrodynamic thrust bearing assembly of claim 11, wherein at least a portion of each of the bearing surfaces is displaced in a displacement direction away from the thrust surface to permit lubricant to enter between the bearing surfaces and the thrust surface, when the bearing pads are in the stressed state.

15. The hydrodynamic thrust bearing assembly of claim 11, wherein the bearing pads are configured to be heated from the first temperature to the second temperature by movement of the rotatable shaft.

16. A method of operating a hydrodynamic thrust bearing assembly including a rotatable shaft, a thrust surface fixedly coupled to the rotatable shaft for rotation therewith, a stationary surface spaced apart from the thrust surface, and a plurality of circumferentially-spaced hydrodynamic thrust bearing pads each including a bearing surface and a support surface and positioned between the thrust surface and the stationary surface such that the bearing surface confronts the thrust surface and the support surface confronts the stationary surface, the method comprising:
maintaining each bearing pad in an unstressed state in which lubricant is prevented from entering between the bearing surfaces and the thrust surface;

warping each bearing pad from the unstressed state to a stressed state in which the lubricant is permitted to enter between the bearing surfaces and the thrust surface;

directing the lubricant between the bearing surfaces and the thrust surface; and transmitting axial thrust loads from the rotatable shaft to the stationary surface via the bearing pads and the lubricant.

17. The method of claim 16, wherein warping each bearing pad includes heating each bearing pad from a first temperature to a second temperature.

18. The method of claim 17, wherein heating each bearing pad from the first temperature to the second temperature includes moving the rotatable shaft.

19. The method of claim 16, wherein warping each bearing pad includes displacing at least a portion of each of the bearing surfaces away from the thrust surface to permit lubricant to enter between the bearing surfaces and the thrust surface.

20. The method of claim 16, further comprising:
returning each bearing pad to the unstressed state.

\* \* \* \* \*